(12) United States Patent
Bui

(10) Patent No.: US 12,504,181 B2
(45) Date of Patent: Dec. 23, 2025

(54) COUNTER-FLOW INDIRECT DEW-POINT EVAPORATIVE COOLER

(71) Applicant: JIANGSU UNIVERSITY, Zhenjiang (CN)

(72) Inventor: Duc Thuan Bui, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 171 days.

(21) Appl. No.: 18/689,431

(22) PCT Filed: Aug. 23, 2022

(86) PCT No.: PCT/CN2022/114174
§ 371 (c)(1),
(2) Date: Mar. 6, 2024

(87) PCT Pub. No.: WO2023/030087
PCT Pub. Date: Mar. 9, 2023

(65) Prior Publication Data
US 2024/0353125 A1 Oct. 24, 2024

(30) Foreign Application Priority Data
Sep. 6, 2021 (CN) .......................... 202111039497.4

(51) Int. Cl.
*F24F 5/00* (2006.01)
(52) U.S. Cl.
CPC .................................. *F24F 5/0035* (2013.01)
(58) Field of Classification Search
CPC ......... F24F 5/0035; F24F 1/0007; F28D 5/00; F28D 5/02
See application file for complete search history.

(56) References Cited

U.S. PATENT DOCUMENTS

| | | | |
|---|---|---|---|
| 6,338,258 B1* | 1/2002 | Lee | F24F 1/0038 62/305 |
| 6,523,604 B1* | 2/2003 | Brooks | F28D 5/00 261/153 |
| 2014/0183764 A1* | 7/2014 | Gilbert | F24F 1/0007 261/146 |

FOREIGN PATENT DOCUMENTS

| | | |
|---|---|---|
| CN | 1090920 A | 8/1994 |
| CN | 104534603 A | 4/2015 |

(Continued)

OTHER PUBLICATIONS

KR-20150046635-A Translation (Year: 2015).*
WO-9002304-A1 Translation (Year: 1990).*

*Primary Examiner* — David J Teitelbaum
(74) *Attorney, Agent, or Firm* — Bayramoglu Law Offices

(57) ABSTRACT

A counter-flow indirect dew-point evaporative cooler is provided, including a plurality of working channels provided parallel to each other, where adjacent working channels are separated from each other by a partition wall; in a gas flow direction, an interior of each working channel is divided into a dry channel and a wet channel; directions of airflow in the adjacent working channels are opposite, so dry channels and wet channels in the adjacent working channels are also oppositely provided, and thus the airflow in the adjacent working channels is in a counter-flow configuration; a product air outlet is provided at a junction of the dry channel and the wet channel; air to be treated enters the wet channel along a straight line from the dry channel to become working air, and obtained product air is discharged from the product air outlet.

3 Claims, 5 Drawing Sheets

(56) References Cited

FOREIGN PATENT DOCUMENTS

| | | | | |
|---|---|---|---|---|
| CN | 113932333 A | 1/2022 | | |
| EP | 0281631 A1 | 9/1988 | | |
| KR | 20150046635 A | * | 4/2015 | ............ F24F 5/0035 |
| WO | WO-9002304 A1 | * | 3/1990 | ............ F24F 1/0059 |

* cited by examiner

COUNTER-FLOW INDIRECT DEW-POINT EVAPORATIVE COOLER

CROSS REFERENCE TO THE RELATED APPLICATIONS

This application is the national phase entry of International Application No. PCT/CN2022/114174, filed on Aug. 23, 2022, which is based upon and claims priority to Chinese Patent Application No. 202111039497.4, filed on Sep. 6, 2021, the entire contents of which are incorporated herein by reference.

TECHNICAL FIELD

The present disclosure relates to the technical field of air conditioning refrigeration, and in particular, to a counter-flow indirect dew-point evaporative cooler.

BACKGROUND

Air conditioners have been widely used in commercial buildings, residential houses, data centers, hospitals, schools, industrial buildings, supermarkets, transportation means, and the like, and are used to control the temperature and humidity of air to provide thermal comfort and a pleasant environment. As the population grows, incomes rise around the world, and global temperatures go up, the demand for air conditioners is also increasing. In addition, greenhouse gases produced during the use of conventional air conditioners also aggravate climate changes.

To reduce energy consumption and greenhouse gas emission of conventional air-conditioning systems, several alternative technologies, such as absorption/adsorption chillers and evaporative coolers, have been proposed. Among these methods, evaporative coolers have a lot of advantages, such as high energy efficiency, low capital and operational costs, ease of installation and maintenance, no greenhouse gas emission, and no heat rejection to the environment.

An operating principle of evaporative coolers is to use large enthalpy of vaporization of water. The temperature of treated air is lowered by evaporation of water. Evaporative coolers are classified into direct evaporative coolers and indirect evaporative coolers.

In the direct evaporative coolers, water and treated air are in direct contact with each other. The evaporation of the water cools the air. However, the decrease in temperature of the treated air will be affected as a humidity ratio increases.

In the indirect evaporative coolers, treated air and water are separated by a separator that enables heat transfer but does not enable mass transfer. The treated air is cooled without any change in its humidity ratio. This is the unique advantage of the indirect evaporative coolers. However, the temperature of the treated air of these coolers is limited by thermodynamics and is less than a wet-bulb temperature of working air. Therefore, this kind of coolers is classified as indirect wet-bulb evaporative coolers.

Later, Dr. Maisotsenko improved the indirect web-bulb evaporative cooler into an indirect dew-point evaporative cooler. In the indirect dew-point evaporative cooler, treated air 100 is cooled in a dry channel 101, as shown in FIG. 1A. A part of air 102 that has been cooled in the dry channel 101 is transferred to a wet channel 103 to become working air 104 to drive water evaporation. Because the working air 104 is cooled before coming into contact with water, the cooling potential becomes higher. Therefore, the working air 104 in the wet channel 103 can reach a dew-point temperature and can cool the treated air 100 in the dry channel 101 to a temperature below a wet-bulb temperature, as shown in a humidity chart in FIG. 1B. The technology was later known as the M-cycle cooling technology.

The most well-known M-cycle indirect evaporative cooler is a Coolerado cooler, which is based on a cross-flow structure 200 shown in FIG. 2A. Treated air 201 flows through a dry channel 202. A part of the treated air 201 is diverted via a series of through-holes 203 to a wet channel 204 to become working air. The treated air 201 and the working air are in a cross-flow structure. Exhausted air 205 and product air 206 are discharged from ends of the wet channel and the dry channel, respectively. With this design, the cooler has higher cooling efficiency than the indirect wet-bulb evaporative cooler. However, the cooler still has some shortcomings: (1) The product air is not completely cooled since a large proportion of treated air is gradually transferred to the wet channel in early stages, and (2) a cross-flow pattern leads to low efficiency of a heat exchanger.

To resolve the problems caused by the cross-flow configuration, an indirect dew-point evaporative cooler with a counter-flow structure (FIG. 2B) has been proposed and studied. Treated air 208 flows through a dry channel 209 and is diverted to be working air 211 at an end of a dry channel 210. The treated air and the working airflow are in a counter-flow structure. Then waste air 212 and product air 213 leave a heat exchanger. The counter-flow indirect dew-point evaporative cooler has a higher cooling capacity and higher dew-point efficiency than the cross-flow cooler.

However, the counter-flow and cross-flow indirect dew-point evaporative coolers shown in FIGS. 2A-2B have an intrinsic problem. That is, the product air suddenly shifts from the dry channel to the wet channel. Because of this, the working air is uneven, and the pressure drop between the dry channel and the wet channel is high. Therefore, more energy is needed to drive the airflow. Therefore, the cooling performance and energy efficiency of these coolers are low.

SUMMARY

In order to solve the shortcomings existing in the prior art, the present disclosure provides a counter-flow indirect dew-point evaporative cooler. In the evaporative cooler, product air can flow from dry channels to wet channels without changing the flow direction thereof. Therefore, the evaporative cooler has a more uniform airflow and uses less energy to drive the airflow in channels thereof, so that the indirect dew-point evaporative cooler has higher cooling performance and energy efficiency, easier control, and improved operability.

The present disclosure adopts the following technical solutions.

A counter-flow indirect dew-point evaporative cooler includes a plurality of working channels provided parallel to each other, where adjacent ones of the plurality of working channels are separated from each other by a partition wall; in a gas flow direction, an interior of each of the plurality of working channels is divided into a dry channel and a wet channel; directions of airflows in the adjacent ones of the plurality of working channels are opposite, so the dry channel and the wet channel in the adjacent ones of the plurality of working channels are also oppositely provided, and thus the airflows in the adjacent ones of the plurality of working channels is in a counter-flow configuration; a product air outlet is provided at a junction of the dry channel and the wet channel; air to be treated enters the wet channel along a straight line from the dry channel to become working air, and obtained product air is discharged from the product air outlet.

Further, the partition wall in the dry channel is a dry surface and needs to be kept dry; while the partition wall in the wet channel is a wet surface and needs to be kept wet.

Further, the partition wall is made of a thermally conductive material, allowing for heat transfer, but not mass transfer between the adjacent ones of the plurality of working channels.

Further, adjacent partition walls of the partition walls are connected to each other by airflow guide members, thus forming the plurality of working channels by the partition walls and the airflow guide members.

Further, a bottom of the partition wall in the wet channel is provided with an extension, the extension extends out of the wet channel from the airflow guide members at the bottom and comes into contact with water, and thus the water can be introduced to an inner wall of the wet channel from the extension.

Further, the water is brought to the partition wall of the wet channel through a clearance fit or a capillary effect between the extension and the airflow guide member at the bottom.

Further, the partition wall of the wet channel is kept wet by spraying.

Further, the product air outlet is provided at the junction of the dry channel and the wet channel, the product air outlet faces only the dry channel, and thus the product air outlet is a dividing line between the dry channel and the wet channel.

Further, an outermost end of the dry channel is provided with an inlet for air to be treated, and a tail end of the wet channel is provided with an exhaust air outlet.

The present disclosure has the following advantages.

In the counter-flow indirect dew-point evaporative cooler according to the present disclosure, the air flows along a straight line when entering the wet channel from the dry channel to become the working air, and thus the direction of the airflow in the same working channel does not change. Therefore, compared with a conventional M-cycle evaporative cooler shown in FIG. 1A, the cooler designed in the present disclosure has more uniform airflow and smaller pressure drop, thus reducing energy consumption. In addition, by adjusting cross sections of air outlets ([506] and [507]), a ratio of airflows in the wet channel to the dry channel can be easily controlled and optimized. This enables the cooler in this application to achieve a higher air speed and higher dew-point cooling efficiency in the channels thereof. Therefore, the counter-flow indirect dew-point evaporative cooler according to the present disclosure has higher cooling performance and energy efficiency.

BRIEF DESCRIPTION OF THE DRAWINGS

FIG. 4A is a schematic diagram illustrating air to be treated entering from a left end, and FIG. 4B is a schematic diagram illustrating air to be treated entering from a right end.

DETAILED DESCRIPTION OF THE EMBODIMENTS

In order to make the objectives, technical solutions, and advantages of the present disclosure clearer, the present disclosure is further described in detail below with reference to the accompanying drawings and embodiments. It should be understood that the specific embodiments described herein are merely intended to explain the present disclosure, rather than to limit the present disclosure.

Figure 3:
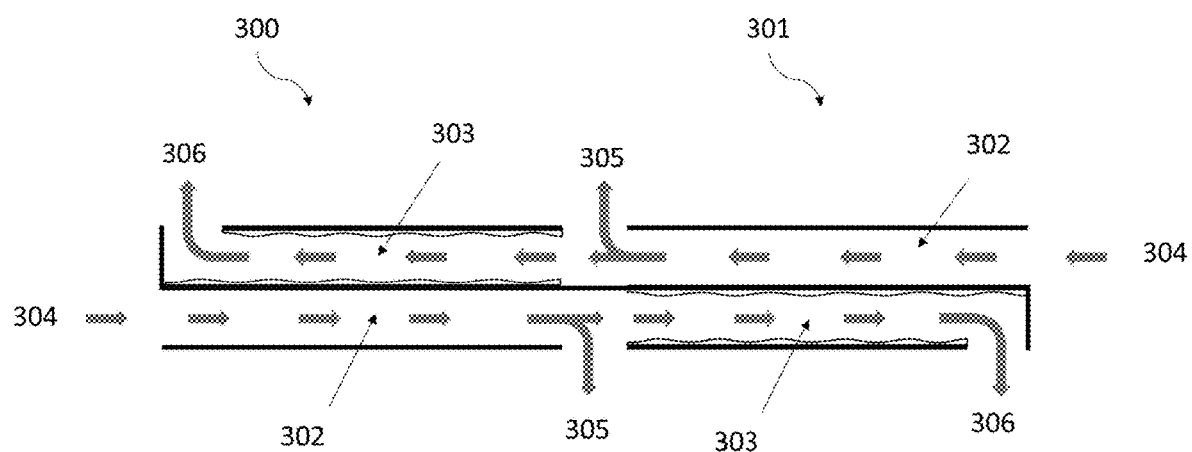
FIG. 3 illustrates an operating principle of a counter-flow indirect dew-point evaporative cooler according to the present disclosure.

The operating principle of a counter-flow indirect dew-point evaporative cooler according to the present disclosure is shown in FIG. 3. The counter-flow indirect dew-point evaporative cooler is formed by two cooling units, that is, a first cooling unit 300 and a second cooling unit 301. The first cooling unit 300 and the second cooling unit 301 each are formed by a dry channel 302 and a wet channel 303 that are provided parallel to each other. In the same cooling unit, dielectric isolation between the dry channel 302 and the wet channel 303 is achieved by a partition plate. The first cooling unit 300 and the second cooling unit 301 are oppositely arranged. Specifically, the dry channel 302 of the first cooling unit 300 and the wet channel 303 of the second cooling unit 301 are oppositely provided and are located on the same straight line; and the wet channel 303 of the first cooling unit 300 and the dry channel 302 of the second cooling unit 301 are oppositely provided and are located on the same straight line. Outermost ends (a right end of an upper portion and a left end of a lower portion in FIG. 3) of the dry channels 302 of the first cooling unit 300 and the second cooling unit 301 are input ports for air to be treated 304, and an outlet of product air 305 is provided at a joint of the wet channel 303 and the dry channel 302 on the same straight line. The outermost ends (a left end of an upper portion and a right end of a lower portion in FIG. 3) of the wet channels 303 of the first cooling unit 300 and the second cooling unit 301 are outlets for exhaust air 306. With reference to FIG. 3, during the operation of the cooler according to this principle, the air to be treated 304 is input from the dry channels 302 of the first cooling unit 300 and the second cooling unit 301, respectively, and sequentially enters the wet channels 303 of the second cooling unit 301 and the first cooling unit 300 along straight lines, respectively, to serve as working air, and the working air entering the wet channels 303 is cooled by evaporation of water in the wet channels 303. A part of cooled air is guided from the outlet of the product air 305 to an outlet of a heat exchanger, so that product air 305 is obtained. The remaining cooled air continues to flow into the wet channel 303 of the other half of the cooler to become working air. Finally, the exhaust air 306 carries moisture to leave the cooler from tail ends of the wet channels.

Figure 4A:
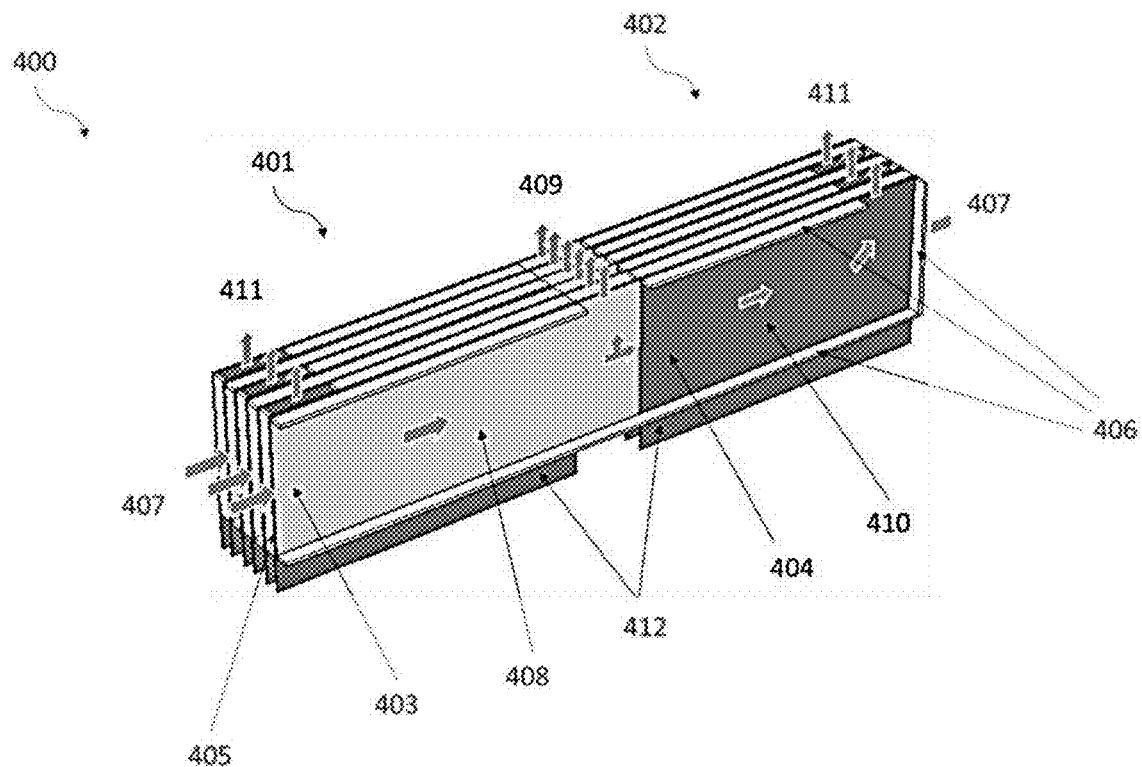
FIGS. 4A-4B are a sectional view and internal airflow configuration diagram of the counter-flow indirect dew-point evaporative cooler according to the present disclosure, where
Figure 4B:
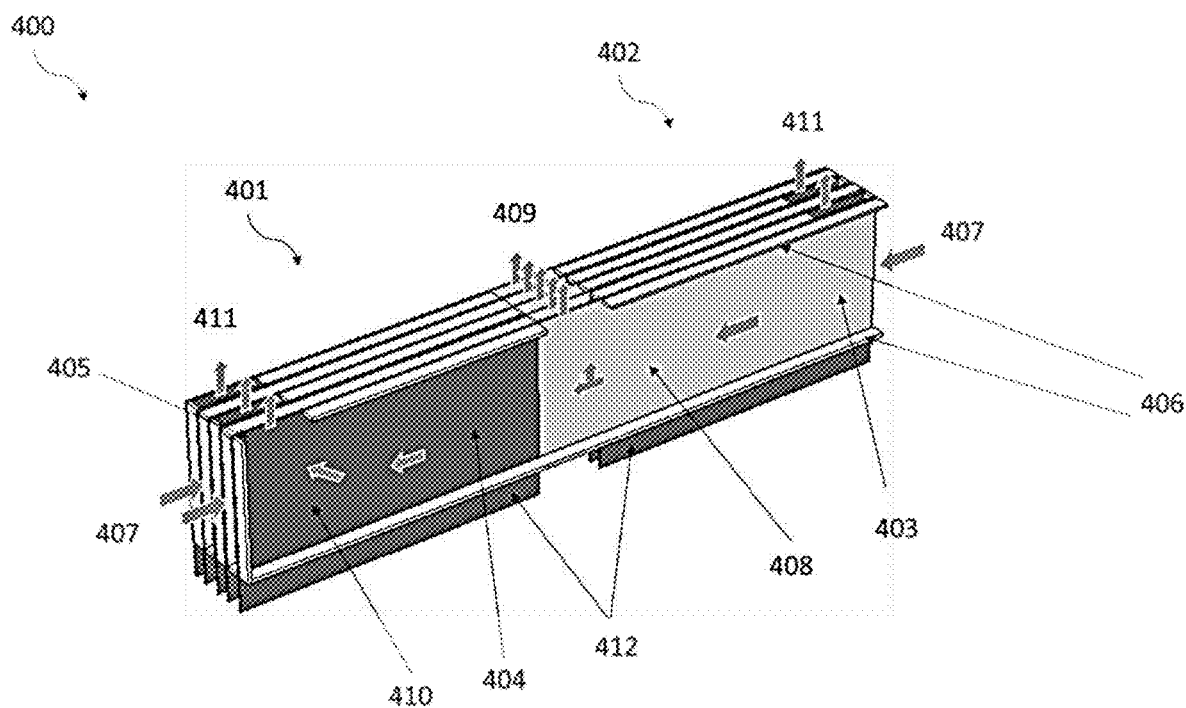

Based on the above principle, the present disclosure designs a counter-flow indirect dew-point evaporative cooler, as shown in FIGS. 4A-4B. The counter-flow indirect dew-point evaporative cooler according to the present disclosure includes a plurality of working channels provided parallel to each other. Adjacent working channels are separated from each other by a partition wall 405, and the partition wall 405 may allow for heat transfer, but not mass transfer between two adjacent working channels. Adjacent partition walls 405 are connected to each other by airflow guide members 406, thus forming the working channels by the partition walls 405 and the airflow guide members 406.

In a gas flow direction, the interior of each working channel is divided into a dry channel 403 and a wet channel 404. A product air outlet 409 is provided at a junction of the dry channel 403 and the wet channel 404, and the product air outlet 409 faces only the dry channel 403 and cannot face the wet channel 404. Therefore, the product air outlet 409 is a dividing line between the dry channel 403 and the wet channel 404. The tail end of the wet channel 404 is provided with an exhaust air outlet 411. Dry channels 403 and wet channels 404 in the adjacent working channels are oppositely provided, and thus the airflow in the adjacent working channels is in a counter-flow configuration.

The partition wall 405 in the dry channel 403 is a dry surface 408, which needs to be kept dry; while the partition wall 405 in the wet channel 404 is a wet surface 410, which needs to be kept wet. In order to ensure that the wet surface 410 is kept wet, a bottom of the partition wall 405 in the wet channel 404 is provided with an extension 412, the extension 412 extends out of the wet channel 404 from the airflow guide member 406 at the bottom and comes into contact with water, and thus the water is introduced into an inner wall of the wet channel 404 from the extension 412. The extension 412 and the airflow guide member 406 at the bottom may be in clearance fit or use a capillary effect to bring water into a layer of hollow materials (such as fabrics and fibers) on a surface of the partition plate, use a device to spray or drip water into wet channels, or produce water droplets to mix into the working airflow.

The outermost end of the dry channel 403 of each working channel is provided with an inlet 407 for air to be treated, and the air to be treated is injected into each dry channel 403 from the inlets 407 on two sides of the cooler. The air to be treated first enters the dry channel 403. In the dry channel 403, the air to be treated is in contact with the dry wall surface 408 of the dry channel 403. After leaving the dry channel 403, a part of the air is transferred from the product air outlet 409 as product air, and the remaining air continues to flow into the wet channel 404. In the wet channel 404, the air is in direct contact with the wet surface 410 of the wet channel 404. At this time, the air in the wet channel 404 as a working gas can cool the air to be treated in adjacent dry channels 403. Finally, the working gas in the wet channel 404 carries moisture to become waste air and leave from the exhaust air outlet 411 at the end of the wet channel. The counter-flow indirect dew-point evaporative cooler 400 may be divided into a first cooling unit 401 and a second cooling unit 402. As shown in FIG. 4A, air to be treated enters from all dry channels 403 on a left side and passes through wet channels 404, and then is discharged from a right side, while in FIG. 4B, air to be treated enters from all dry channels 403 on a right side and passes through wet channels 404, and then is discharged from a left side, thus forming a counter-flow configuration.

Figure 1A:
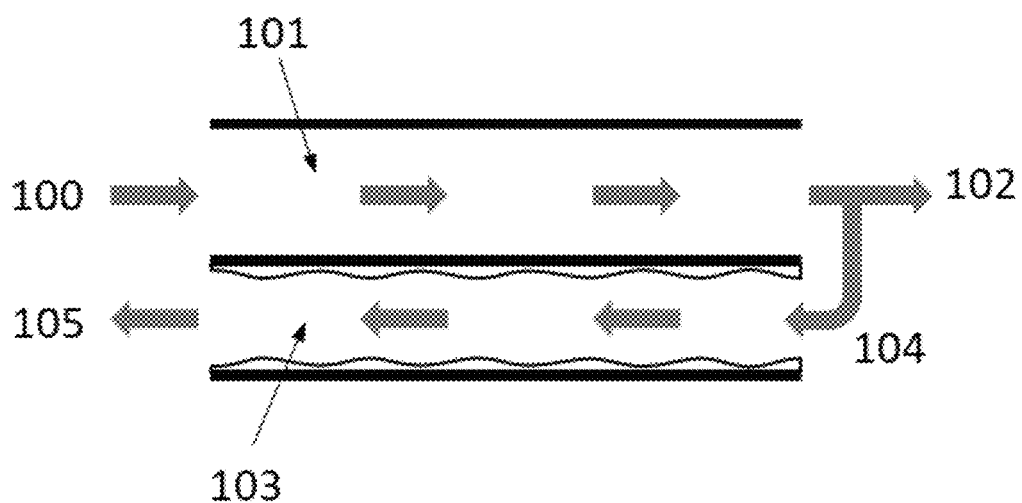
FIG. 1A is diagram illustrating an operating principle of an existing indirect dew-point evaporative cooler.
Figure 1B:
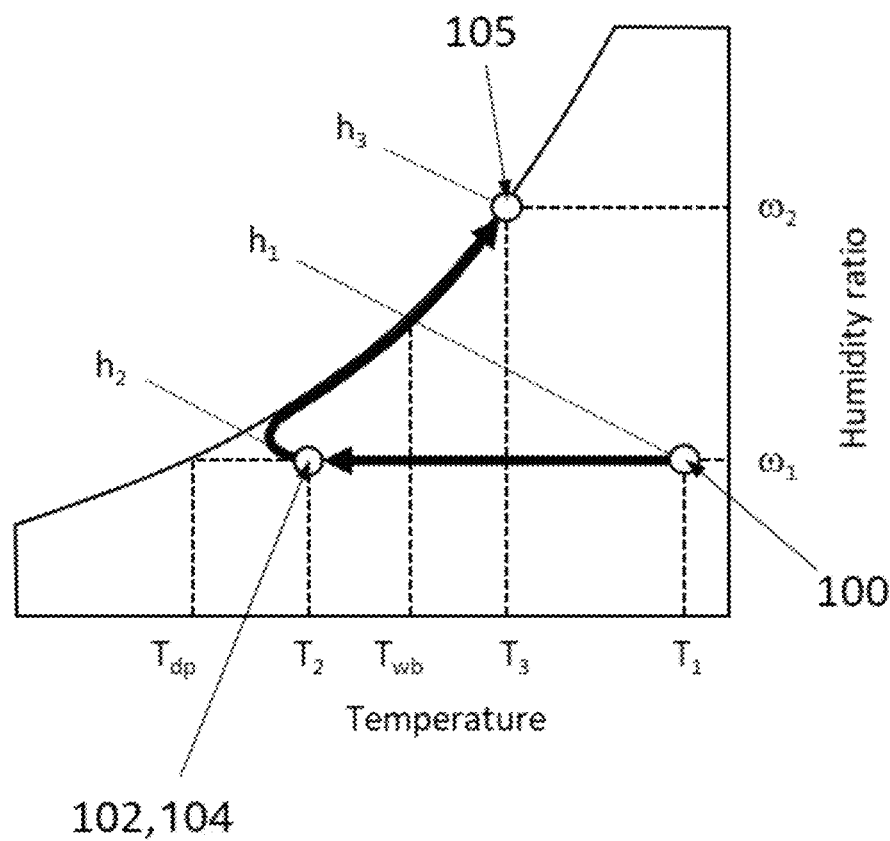
FIG. 1B is a schematic diagram illustrating a relationship between temperature and humidity of the existing indirect dew-point evaporative cooler.
Figure 2A:
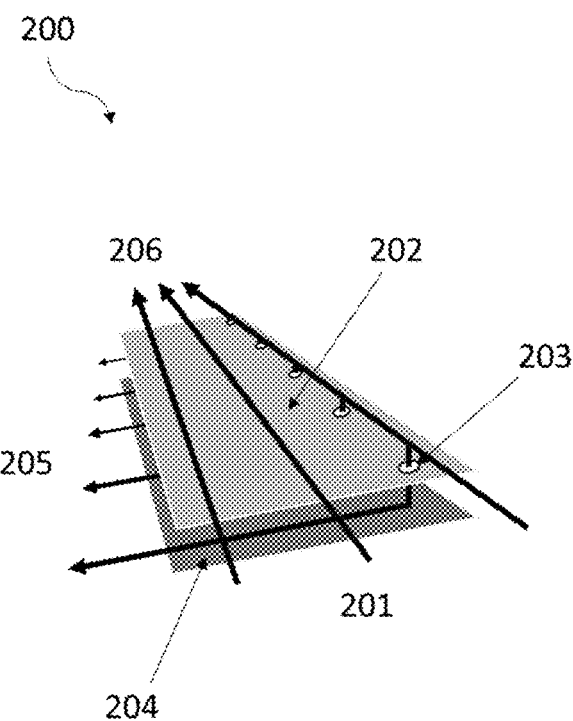
FIG. 2A is a schematic diagram of a cross-flow structure of an existing indirect dew-point evaporative cooler.
Figure 2B:
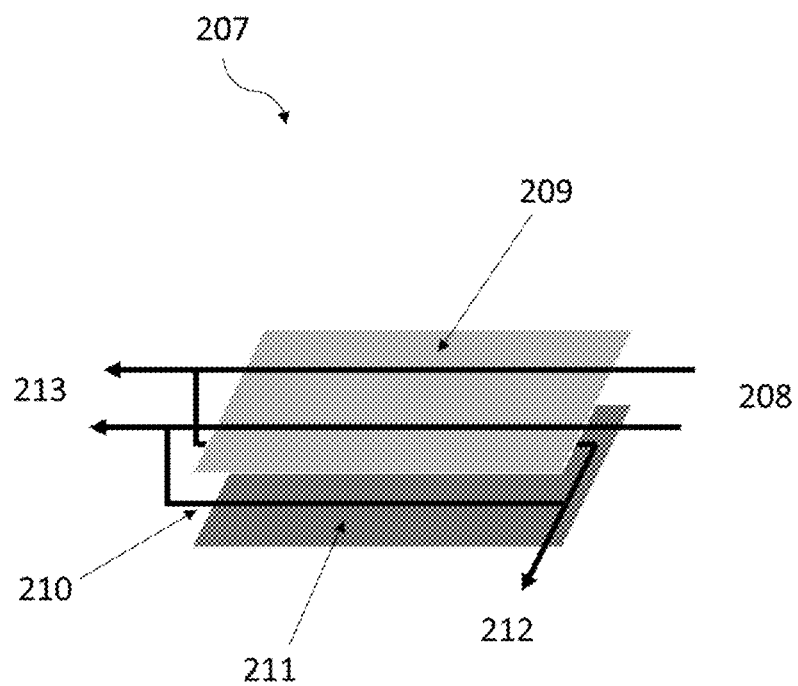
FIG. 2B is a schematic diagram of a counter-flow structure of the existing indirect dew-point evaporative cooler.

In the counter-flow indirect dew-point evaporative cooler according to the present disclosure, when the air enters the wet channels 404 from the dry channels 403 to become working air, the direction of the air is not changed. Therefore, compared with a conventional M-cycle evaporative cooler shown in FIG. 1A, the cooler according to the present disclosure has more uniform airflow and smaller pressure drop. Therefore, the counter-flow indirect dew-point evaporative cooler according to the present disclosure has higher cooling performance and energy efficiency.

In addition, in this embodiment, the working channels of the cooler are horizontally provided, so the air in the working channels also flows in a horizontal direction, and exhaust air and product air are discharged from bottom to top. However, the present disclosure further includes other configurations, in which a heat exchanger, wet channels, dry channels, and airflow are in different directions, provided that they are in accordance with the cooling principle shown in FIG. 3.

In this embodiment, the heat exchanger is horizontal, the wet channels and the dry channels are vertical, air to be treated is horizontal, and exhaust air and finished air are discharged from bottom to top. However, the present disclosure further includes other configurations, in which a heat exchanger, wet channels, dry channels, and airflow are in different directions, provided that they are in accordance with the cooling principle shown in FIG. 3.

Figure 5:
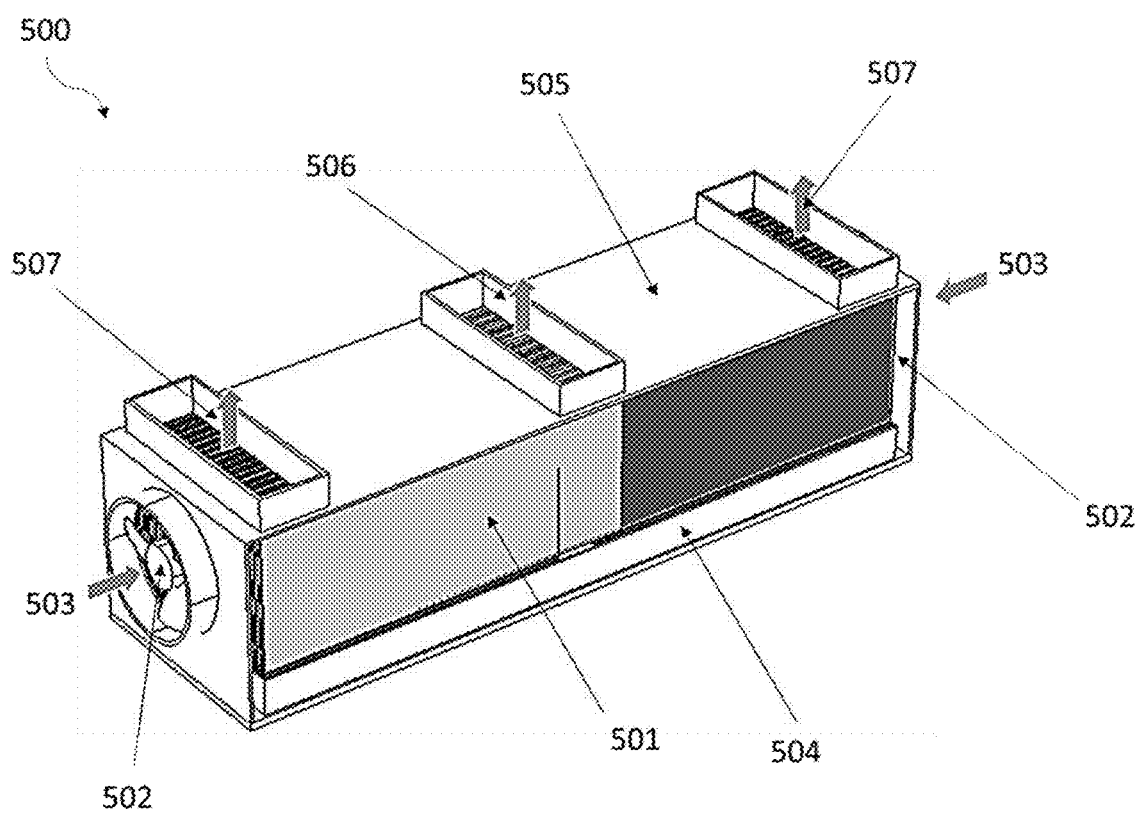
FIG. 5 illustrates a compact counter-flow indirect dew-point evaporative cooler according to the present disclosure.

In an embodiment of the present disclosure, a structure is shown in FIG. 5. A counter-flow indirect dew-point evaporative cooler 500 according to the present disclosure includes one or more working channels 501, with a structure and airflow configuration shown in FIGS. 4A-4B. The cooler includes the following other components: one or more air blowers 502 arranged at an air inlet 503. The air blowers 502 are used to input air to be treated to the working channel 501. By adjusting cross sections of air outlets (a left air outlet 506 and a right air outlet 507), airflow ratios in the wet channels and the dry channels can be easily controlled and optimized. This enables the cooler in this application to achieve a higher air speed and higher dew-point cooling efficiency in the channels thereof. One or more water containers 504 are arranged at the bottom of a system to store and supply water to the wet channels. A case 505 and a support structure are provided to provide mechanical strength and support for other assemblies, protect the system, guide airflow in correct directions, and prevent undesirable air leakage or prevent air from bypassing the heat exchanger.

The above examples are only used to illustrate the design ideas and features of the present disclosure, such that those skilled in the art can understand and implement the content of the present disclosure, accordingly; and the protection scope of the present disclosure is not limited to the above examples. Therefore, all equivalent changes or modifications made according to the principle and design idea disclosed in the present disclosure fall within the protection scope of the present disclosure.

What is claimed is:

1. A counter-flow indirect dew-point evaporative cooler, comprising a plurality of working channels provided parallel to each other, wherein adjacent working channels of the plurality of working channels are separated from each other by partition walls; in a gas flow direction, an interior of each of the plurality of working channels is divided into a dry channel and a wet channel; directions of airflows in the adjacent working channels of the plurality of working channels are opposite, so the dry channel and the wet channel in the adjacent working channels of the plurality of working channels are oppositely provided, and thus the airflows in the adjacent working channels of the plurality of working channels are in a counter-flow configuration; a product air outlet is provided at a junction of the dry channel and the wet channel; air to be treated enters the wet channel along a straight line from the dry channel to become working air, and obtained product air is discharged from the product air outlet;

a bottom of each of the partition walls in the wet channel is provided with an extension, the extension extends out of the wet channel from an airflow guide member at the bottom of each of the partition walls and comes into contact with water, and thus the water is introduced to an inner wall of the wet channel from the extension;

an outermost end of the dry channel is provided with an inlet for the air to be treated, and a tail end of the wet channel is provided with an exhaust air outlet;

a case is provided;

one or more water containers are arranged to store and supply the water to the wet channel;

an air blower is arranged at the inlet for the air to be treated to input the air to be treated to the plurality of working channels;

adjacent partition walls of the partition walls are connected to each other by the airflow guide member, thus forming each of the plurality of working channels by two of the partition walls and the airflow guide member;

the water is brought to each of the partition walls of the wet channel through a clearance fit or a capillary effect between the extension and the airflow guide member at the bottom of each of the partition walls;

each of the partition walls is made of a thermally conductive material, allowing for heat transfer, but not mass transfer between the adjacent working channels of the plurality of working channels; and each of the partition walls in the dry channel is a dry surface and needs to be kept dry; while each of the partition walls in the wet channel is a wet surface and needs to be kept wet.

2. The counter-flow indirect dew-point evaporative cooler according to claim 1, wherein each of the partition walls of the wet channel is kept wet by spraying.

3. The counter-flow indirect dew-point evaporative cooler according to claim 1, wherein the product air outlet is provided at the junction of the dry channel and the wet channel, the product air outlet faces only the dry channel, and thus the product air outlet is a dividing line between the dry channel and the wet channel.

* * * * *